Sept. 1, 1936.   G. A. PATTERSON   2,052,649
ELECTRICALLY HEATED APPARATUS AND METHOD OF OPERATING
Filed Sept. 10, 1932    5 Sheets-Sheet 2

INVENTOR
George A. Patterson
BY Forbes Selsby
ATTORNEY

Sept. 1, 1936. G. A. PATTERSON 2,052,649
ELECTRICALLY HEATED APPARATUS AND METHOD OF OPERATING
Filed Sept. 10, 1932 5 Sheets—Sheet 5

INVENTOR
George A. Patterson
BY Forbes Seeley
ATTORNEY

Patented Sept. 1, 1936

2,052,649

UNITED STATES PATENT OFFICE 2,052,649

ELECTRICALLY HEATED APPARATUS AND METHOD OF OPERATING

George Anthony Patterson, Buffalo, N. Y., assignor to National Aniline and Chemical Company, New York, N. Y., a corporation of New York Application September 10, 1932, Serial No. 632,544

18 Claims. (Cl. 219—47)

My invention relates to electrical heating apparatus and methods of using the same, and particularly to devices for heating materials by induction.

The ordinary induction heater comprises a primary consisting of a number of turns of wire connected to a source of alternating current with the turns encircling a member formed of conducting material which serves as a secondary. In heaters of this type the application of alternating current to the primary induces current flow in the secondary which causes the member serving as the secondary to be heated. The primary usually consists of a large number of turns of wire, whereas the secondary consists of a member to be heated, which may be a mass of metal, a metallic vessel, or other metallic member.

The patent to Davis 1,680,595, dated August 14, 1928 describes an induction heater applied to a vessel for heating liquids contained therein in which the vessel constitutes the secondary and current is induced in the vessel by the action of alternating current supplied to a primary to heat the vessel and its contents. The Davis patent also describes means for generating heat substantially uniformly throughout the walls of the vessel during operation and means for varying the current flow in the primary so that the current induced in the vessel and the heat applied to the liquid may be varied.

Induction heaters possess considerable advantage over electrical heaters in which heat is generated by resistance elements. The cost of operating induction heaters is much less than that of operating resistance heaters, and heat may be concentrated and high temperatures produced and maintained in induction heaters more readily than with resistance elements because of the difficulty presented in arranging a large number of resistance elements in a limited space. Moreover induction heaters may be used for developing heat in the member to be heated or in the case of a liquid the heat may be developed in a member in direct contact with the liquid whereas resistance elements are ordinarily placed adjacent to the member to be heated and heat the same by radiation and convection. However, resistance elements possess the advantage that they may be used in applying heat in varying amounts to different parts of a vessel or other member to be heated. This flexibility of operation has not heretofore been obtained by the use of induction heaters.

My invention is an improvement over induction heaters such as that described in the Davis patent in that the location as well as the amount of heat developed is selectively controlled to obtain the desired application of heat. This feature of my invention is of particular advantage in heating stills or other vessels in which liquids are heated and in which the level of the liquid varies during operation.

Among the objects of my invention are to provide a method and means for heating materials by induction in which the location of the heat applied, the area of the member heated and the amount of heat generated therein are selectively varied, to provide novel constructions and arrangements of the elements of the heater, and to provide a method of distilling liquids whereby overheating of the apparatus and overheating and refluxing of the vapors may be avoided. These and other objects and features of my invention will appear from the following description thereof.

As applied to a still or the like, my invention provides for the application of a large amount of heat to that portion of the vessel in contact with the liquid, whereas that portion of the vessel in contact with the vapors above the liquid may not be heated at all or may be heated to a comparatively low temperature sufficient to prevent refluxing of the vapors in the still. Furthermore, the area of the vessel to which a large amount of heat is applied may be varied so that as the level of the liquid is progressively lowered during distillation, the area in which the greater amount of heat is generated is progressively decreased and confined to substantially that portion of the vessel in contact with the liquid being distilled. In this way the upper portion of the vessel does not become overheated and danger of cracking the vessel due to uneven expansion thereof is avoided. Moreover, the vapors produced are not overheated or decomposed by contact with the surfaces which are at excessively high temperatures.

Although my invention is particularly adapted for use in heating stills and vessels containing liquids, it will be apparent that my invention may also be applied in heating other materials or devices, as for example autoclaves, storage tanks, kettles, and apparatus for promoting catalytic reactions such as the apparatus disclosed in United States Patent No. 1,604,739 to C. R. Downs. However, for the purpose of illustration the invention will hereinafter be shown and described as applied to a still and to a refluxing kettle.

In the construction shown in Figs. 1 to 9 of the drawings the still comprises a vessel having vertical walls 2, and a hemispherical bottom 4. The walls 2 of the vessel are provided with an annular rim 6 adjacent the top of the vertical walls to which a cover for the vessel may be secured. An annular flange 8 formed integrally with the vertical wall 2 of the vessel, extends outwardly from the walls thereof and is spaced a short distance below the rim 6. The flange 8 is provided with a plurality of openings 10 spaced about the flange through which pass bolts 12 for supporting the primary of the induction heater. The lower portions of the bolts 12 pass through brass supporting bars 13 supporting vertical rods 16 which extend downwardly adjacent the walls 2 of the vessel. The rods 16 are threaded on each end and are secured by nuts to the supporting bars 13 carried by the bolts 12. Tie bars 14 and 14' which also may be of brass or other suitable material are provided at the upper and lower ends of the rods 16 to hold the rods in spaced position adjacent the walls of the still.

A conductor 20 which constitutes the primary for the heater is shown in the form of a conductor of rectangular cross section extending in a coil about the vertical wall of the vessel between the rods 16. The turns of the conductor are spaced vertically by means of suitable insulating plates 18, each of which is provided with holes through which the rods 16 extend. The conductor may comprise any suitable number of turns depending upon the amount of current which the conductor is to carry and the amount of heat which is to be developed in the wall of the vessel. The conductors are insulated from tie bars 14 and 14' by means of insulating blocks 21 and 21' respectively. The rods on each side of the ends of the conductors are provided with insulating bars 22 and 22' instead of the blocks 21 and 21'. The bars 22 and 22' extend beyond the outer rods 16 and together with insulating cross-members 23 or 23' provide supports for the conductor leads. Lock nuts on the rods 16 hold the tie bars and insulating blocks in position forming a unitary structure loosely supporting the conductor 20.

Figures 1, 2:
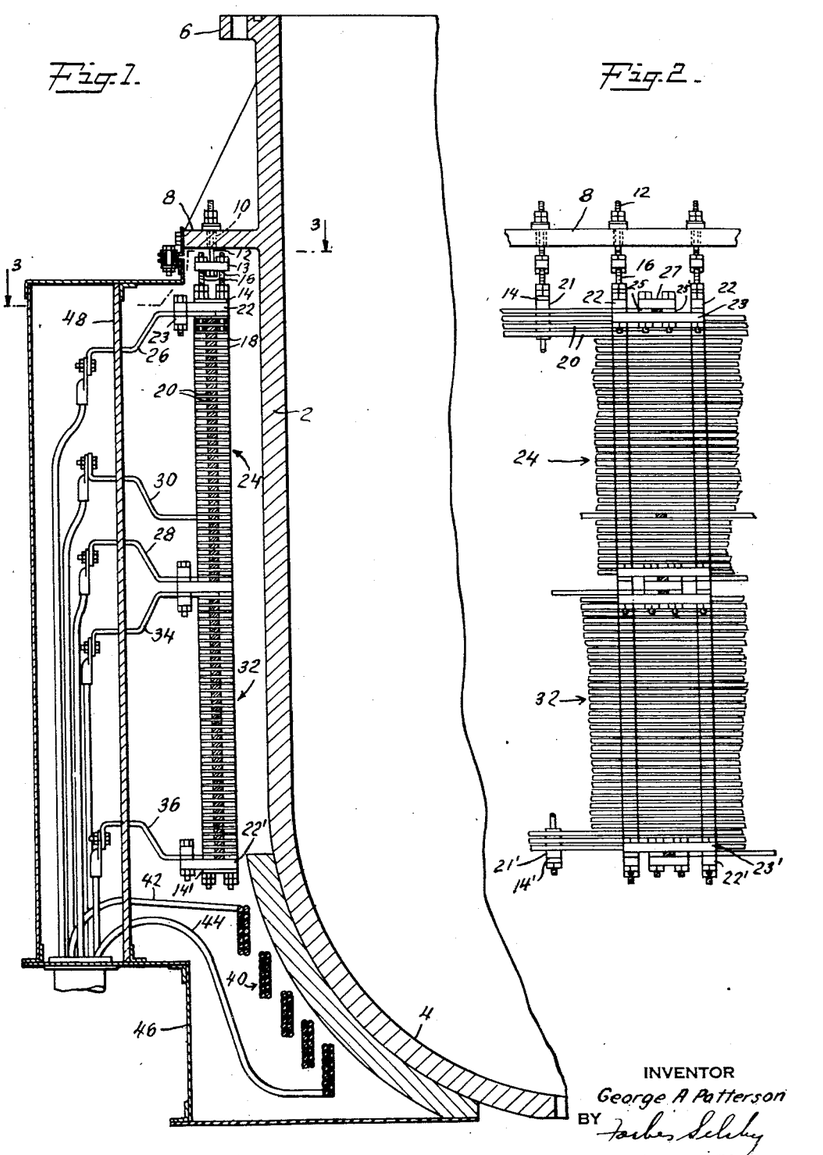
Fig. 1 is a side view partly in section showing a still provided with a heating device constructed in accordance with one of the preferred forms of my invention.
Fig. 2 is a view taken at right angles to Fig. 1, showing the arrangement of details of the construction.
Figure 3:
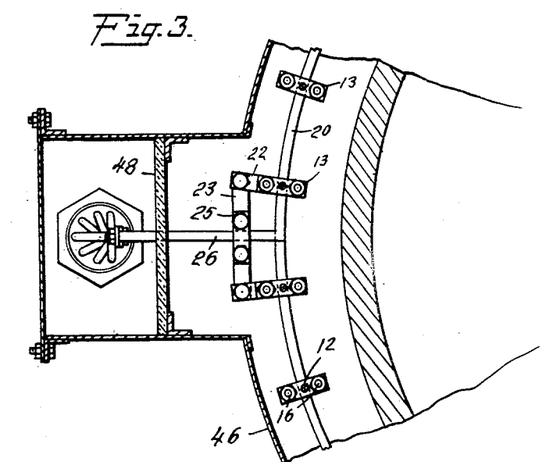
Fig. 3 is a sectional plan view on section line 3—3 of Fig. 1 of the portion of the apparatus shown in Figs. 1 and 2.
Figure 4:
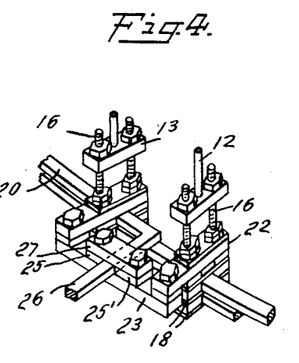
Fig. 4 is a perspective of a detail of the construction.

The terminal for the upper end of the conductor is illustrated in Fig. 4 with the lead 26 connected to the conductor extending at right angles to the turns thereof. The lead 26 may be suitably brazed or otherwise secured to the conductor 20 and rests on the insulating bar 23 between insulating blocks 25 and 25'. The lead may be clamped in position by means of an insulating member 27 bolted or otherwise secured to bar 23. The bar 23 is secured by bolts to the blocks 22 on each side of the conductor lead 26. The leads connected to the opposite end and intermediate points of the conductor may be similarly constructed providing a support for the connection which protects the same from injury.

The conductor which constitutes the primary for the heater, preferably is formed in a plurality of sections which in turn may be subdivided into smaller sections. In the form of the invention shown in the figures of the drawings the conductor 20 is provided with an upper section 24 connected through switching mechanism to a suitable source of alternating current by the lead 26. The lower portion of the section 24 is similarly connected by the lead 28 through a switch to the source of alternating current. A third lead 30 extends from a point intermediate the ends of the conductor section 24 to the source of current in order that a portion of the section 24 of the conductor may be disconnected from the circuit and in order that the flow of current through either the upper or lower portion of the section 24 may be varied selectively. A second section 32 of the conductor is positioned below the section 24 and is similarly connected by the leads 34 and 36 through switching mechanism to the source of alternating current in order that the current applied thereto may be controlled to obtain the desired heating effect. As illustrated, the section 32 is not subdivided into portions but it will be apparent that provision may be made to divide either section into as many subdivisions as desired and that more than two conductor sections may be used if preferred.

The still is preferably provided with an additional conductor 40 in the form of induction coils positioned adjacent the hemispherical portion of the bottom of the vessel in order to heat the bottom thereof uniformly as described in the patent to Davis mentioned above. The construction and arrangement of the coils of conductor 40 are illustrated for convenience as similar to those of the Davis device. However, if desired, the coils 40 may be omitted altogether although ordinarily the conductor 40 is employed when it is desired to heat the contents of the still to a high temperature. The coils of conductor 40 are connected to the source of alternating current by leads 42 and 44 independently of the conductor 20.

That portion of the vessel to which the conductors 20 and 40, which constitute the primary of the heater, are applied, is preferably enclosed within a heat insulating casing 46. A panel 48 to which the leads from the conductors 20 and 40 pass, is positioned so as to provide convenient access to the electrical circuit.

In order to control the flow of current selectively so that the sections of the conductor 20 may be included in the circuit and the current flow through said sections varied to apply the desired amount of heat to that area of the still adjacent the various sections of the conductor 20, switches 50 and 52 are provided. An additional switch 54 in circuit with the conductor 40 is also employed to connect and disconnect that portion of the primary adjacent the hemispherical bottom of the still with a source of alternating current.

Figure 5:
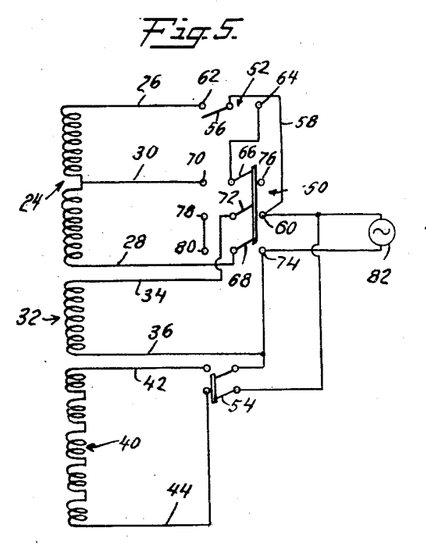
Fig. 5 is a wiring diagram showing the arrangement of the circuit elements of the form of the apparatus illustrated in Figs. 1 to 4.
Figure 6:
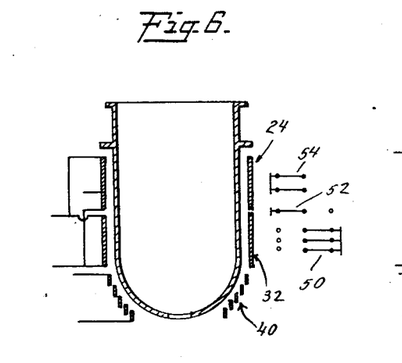
Figs. 6 to 9 inclusive are diagrammatic illustrations of various adjustments of the heating elements.
Figure 7:
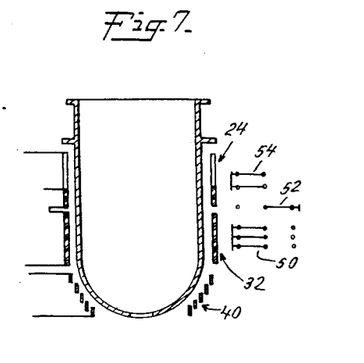
Figure 8:
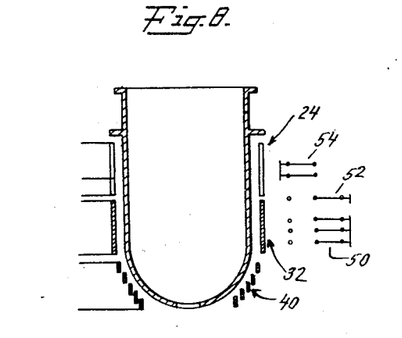
Figure 9:
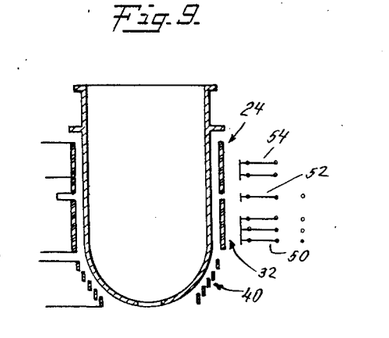

The circuit arrangement preferred for controlling the current flow through the conductors 20 and 40 of the primary is illustrated in Fig. 5. In this arrangement the switch 50 is a three-pole double throw switch and switch 52 is a single-pole double throw switch. Switch 54 which controls the operation of conductor 40 may be a single-pole single-throw switch operated independently of the operation of the switches 50 and 52. The lead 26 connected to the upper end of the conductor section 24, is connected to the left hand contact 62 of the switch 52, and the switch blade 56 of the switch 52 is connected through the line 58 to the middle right contact 60 of the switch 50. The opposite contact 64 of the switch 52, on the right side of the switch as illustrated, is connected to upper blade 66 of the three-pole switch 50. The lower end of conductor section 24 is connected by lead 28 to the lower switch blade 68, and the lead 30 which is connected to an intermediate point in the section 24, is connected to the upper left contact 70 of the switch 50. The upper end of the lower conductor section 32 is connected by the lead 34 to the middle switch blade 72 of the switch 50 while the lower end of the section 32 is connected through lead 36 to the lower right contact 74 of the switch 50. The upper right contact 76 is blank and the middle and lower left contacts 78 and 80 are connected to each other. The source of alternating current 82 is connected to the circuit through the middle and lower right contact 60 and 74 of the switch 50.

In operating the device with the foregoing circuit arrangement in heating or distilling liquids the circuit is controlled to provide four adjustments of heat independently of the application of heat to the vessel through the operation of the conductor 40. Thus, when the vessel is filled with liquid to a point above or adjacent to the upper end of the section 24 of the conductor, the switch 50 is thrown to the right and the switch 52 is thrown to the left to develop the maximum heat in the vessel and bring the liquid to the desired temperature or to heat it to boiling. When the switches are in this position the conductor sections 24 and 32 are connected in parallel as shown diagrammatically in Fig. 6 of the drawings. Current then flows from source 82 to contact 60, thence through conductor 58, switch blade 56, and lead 26 to conductor section 24 and back through lead 28 and switch blade 68 to contact 74 and the opposite side of the current source 82. Current also flows in parallel from current source 82 through contact 60, switch blade 72 and lead 34 to conductor section 32 and back through lead 36 to contact 74 and current source 82. The current flow in this circuit arrangement is relatively large so that the heat developed in the vessel is large and extends through substantially the whole vertical wall thereof. Heat may also be developed in the hemispherical portion of the vessel by closing switch 54 to supply current to conductor 40.

As distillation continues and the level of the liquid in the vessel is lowered, the switch blade 56 of switch 52 is thrown to the right engaging contact 64 and the switch 50 is thrown to the left. With the switches in these positions, current passes from the current source through connection 58, switch blade 56, contact 64, switch blade 66, contact 70, connection 30, the lower portion of conductor 24, connection 28, switch blade 68, contacts 80 and 78, switch blade 72, connection 34, conductor 32, connection 36, and thence to the current source. With this path of current flow the upper portion of conductor 24 is disconnected while the lower portion is arranged in series with conductor 32. Such an employment of the heating element is shown diagrammatically in Fig. 7 of the drawings.

When the level of the liquid in the vessel falls still lower, switch 50 is moved again to the right while the switch blade 56 of switch 52 remains in engagement with contact 64. In this position only the lower conductor sections 32 and 40 remain in circuit as shown diagrammatically in Fig. 8 and only the lower portion of the vessel is heated.

When the liquid level in the vessel has dropped to the top of coil 40, it may be desirable to supply a low degree of heat to the upper portions of the vessel to prevent condensation of liquid on the walls. For this purpose the conductor sections are connected in series as shown diagrammatically in Fig. 9 by throwing both switch 50 and switch 52 to the left. Current then passes from current source 82 through contact 60, connection 58, switch blade 56 and lead 26 to the upper conductor section 24 and through lead 28, switch blade 68, contacts 80 and 78, and switch blade 72 to lead 34 connected to the lower conductor section 32. Current then passes back through lead 36 and contact 74 to the current source. The coil 40 is connected to a suitable current source. The lower induced voltages afforded by the series connection of coils 24 and 32 reduces the current flow, and the zone of most intense heating is restricted to the portion of the vessel occupied by liquid. Overheating of the upper portions of the vessels is consequently avoided.

The foregoing method of operation ensures the application of heat to that portion of the vessel in contact with the liquid therein while the upper portion of the walls of the vessel are not overheated so that undue expansion thereof does not take place and danger of cracking or distorting the vessel is obviated. Furthermore, the walls of the vessel, being at comparatively low temperatures, do not cause decomposition or cracking of the vapors distilled off of the liquid in the vessel and coming in contact therewith.

In any of the above circuit arrangements the conductor 40 may be connected or disconnected from the source of current as desired. When the level of the liquid in the still has fallen below the lower conductor section 32, the distillation may still be continued by means of the conductor 40. All or a portion of the walls of the vessel may be heated as distillation continues by adjusting the switches 50 and 52 to supply current to the conductor sections 24 and 32 to prevent refluxing of the material. On the other hand, the switches 50 and 52 may be opened, thus disconnecting the conductor 20 altogether and allowing the walls of the vessel to cool.

Figure 10:
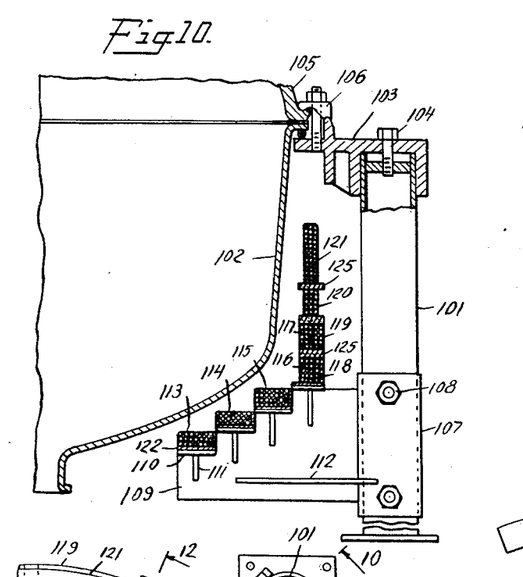
Fig. 10 is a view, partly in section, partly in elevation showing a kettle provided with a modified form of heating device constructed in accordance with my invention.
Figure 11:
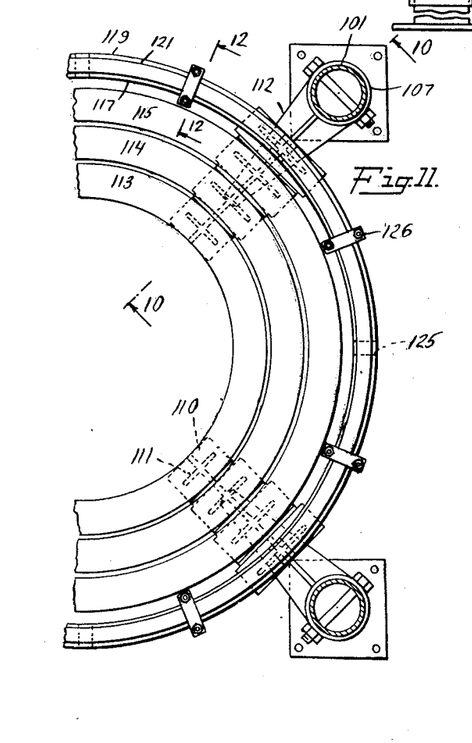
Fig. 11 is a plan view of the heating apparatus of Fig. 10, the vessel 102 and supporting lugs being removed from the supporting legs to more clearly show the induction coil mounting.
Figure 12:
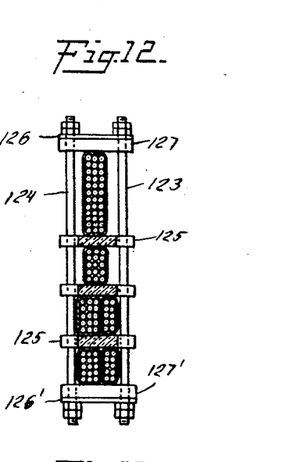
Fig. 12 is a section on line 12—12 of Fig. 11 showing details of the coil arrangement and coil bracing.

Figs. 10 to 12 of the drawings illustrate a modified construction of the apparatus of my invention. The induction heater illustrated in these figures is especially suitable for the manufacture of dibenzylsuccinate, dichlorbenzylchloride, Carbanthrene blue green FFB, for use in the purification of methyl-benzanthrone, and for similar processes.

With special reference to Fig. 10 of the drawings, vertical tubular supporting legs 101 are circumferentially disposed about an enamel-lined kettle 102. At the top of the tubular members 101, lugs 103 are provided to support the rim of the kettle. The lugs 103 are secured to the vertrical supporting members 101 by means of bolts 104. The top 105 of the kettle is shown clamped to the kettle by means of clamps 106 mounted on the lugs 103.

A tubular sleeve 107 is fitted over each of the vertical supporting members 101 and may be suitably affixed thereto, as for example by means of bolts 108. Mounted on the sleeve are radially disposed stepped coil supporting members or plates 109. Each step of the supporting plates 109 is provided with a plate 110 adapted to support an induction coil. Suitable bracing flanges or gussets 111 are provided on the plate 109 for additionally strengthening the plates 110. The horizontal flanges 112 may also be provided to give additional rigidity to this member. The plates 109 may be affixed to sleeves 107 in any suitable manner as by brazing, welding, etc. depending upon the materials used for their construction. The supporting and bracing members may be constructed of brass or other suitable material.

Mounted on the plates 110 of the supporting members 109 are a series of electrical conductors or coils 113 to 121 which constitute the primary of the induction heater. These coils may consist of solid magnet wire suitably insulated with asbestos or other suitable heat resistant insulation, and each coil is preferably covered with asbestos tape. The coils 113, 114, 115, 116, and 117 are separated from the metal supporting plates 110 by means of insulating plates 122.

Figure 13:
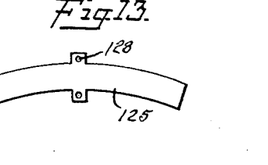
Fig. 13 is a detail of one of the coil insulating members.

The coils 116 to 121, as shown in Fig. 12, are formed into a single unit. These coils are held firmly in position by means of vertical rods 123 and 124. Arcuate separating plates 125 of suitable insulating material, such as ebony asbestos wood, are provided to maintain the coils spaced from one another. A plan view of one of the insulating members 125 is shown in Fig. 13, the holes 128 being provided for the passage of rods 123, 124. End plates or tie bars 126 and 126' of brass are provided to suitably space the rods 123, 124, and to hold the coils in position. These bars are insulated from the coils by means of insulating blocks or bars 127 and 127'. The rods 123, 124 may be threaded at the ends and secured by nuts to the end plates 126, 126'.

In assembling the apparatus illustrated, the sleeves 107 may be fitted over supporting members 101; the kettle may then be put in position, and the sleeves adjusted along supporting members 101 until they are in suitable position with respect to the kettle, whereat the tubular members 101 may be drilled and bolts 108 inserted.

Figure 14:
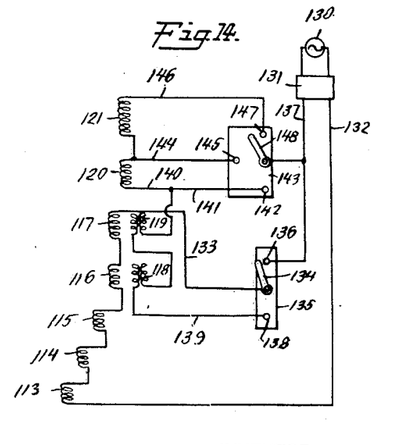
Fig. 14 is a wiring diagram showing the arrangement of the circuit elements in the modification of the invention illustrated in Figs. 10 to 13.

In Fig. 14 there is shown a wiring diagram adapted for the apparatus illustrated in Figs. 10–12. In this diagram 130 represents a suitable alternating current supply. A main switch 131 is provided to control the supply of current from supply 130. This switch may be provided with an overload throw-out, if desired. The current source 130 is connected by means of lead line 132 to coil 113. Coils 113, 114, 115, 116, and 117 are arranged in series, coil 117 being connected by means of line 133 to the arm 134 of a single pole two-throw switch 135. One contact 136 of this switch is in turn connected to line 137 returning to the current source 130. The other contact 138 is connected through line 139 to coil 118. Coils 118 and 119 are serially arranged, and coil 119 is connected through line 140 to coil 120, and through line 141 to contact 142 of switch 143. The coil 120 is connected to coil 121 and also by means of line 144 to contact 145 of the switch 143. The coil 121 at its end remote to coil 120 is connected through line 146 to contact 147 of switch 143.

With this circuit arrangement four adjustments of the circuit may be obtained, inducing current into and thus effecting heating of various desired portions of the kettle 102.

Figure 15:
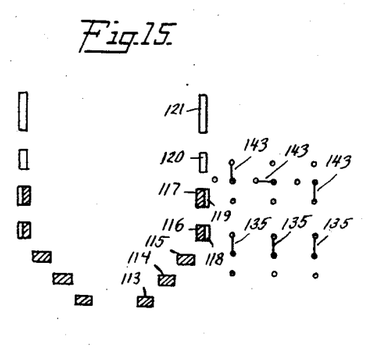
Figs. 15 to 18 inclusive are diagrammatic illustrations of the various adjustments of heating elements obtainable by the circuit arrangement of Fig. 14.

Referring to Fig. 15, when the arm 134 of switch 135 is in the up position, i. e. connected with the contact 136, the current will pass in an electric circuit through line 132, through coils 113, 114, 115, 116, and 117 in series, through line 133 to the arm 134, through arm 134 and contact 136 to the line 137, and thence to the current source. When the switch 135 is in this position, i. e. the arm contacting with contact 136, the coils 118, 119, 120 and 121 will not receive current from the source 130 and hence current will be induced in the vessel 102 only by means of the coils 113 to 117.

Figure 16:
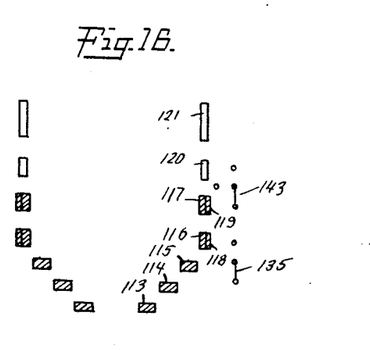

Fig. 16 of the drawings illustrates the heating effect obtained when the arms of switches 135 and 143 are both in the down-position. In this position of the switches current will be supplied from the current source 130 through line 132 to coil 113, through coils 113, 114, 115, 116 and 117 in series, and line 133 to the arm 134 of switch 135, thence to contact 138 of the switch 135, and through line 139 to coil 118, passing through coils 118 and 119 in series, and from coil 119 through line 141 to contact 142 of switch 143, through switch arm 148 and back to the current source 130 by means of line 137. With this arrangement of the coils, currents will be induced in the vessel in the same portions thereof as in Fig. 15. But the inductance at the portion of the vessel adjacent coils 116 to 119 will be higher than formerly, compared with that in the lower portions of the vessel, because of the added induction coils 118 and 119, and consequently this portion of the vessel will receive a greater proportion of the heat.

Figure 17:
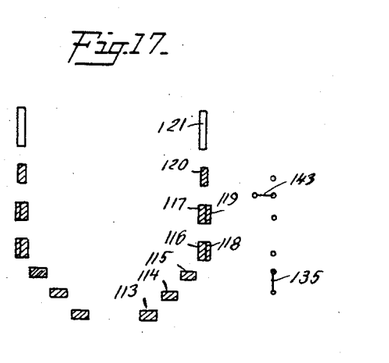

With the switches in the position indicated in Fig. 17, the current supplied from source 130 through line 132 travels through coils 113 to 117 in series, through line 133, and switch arm 134, thence through contact 138, line 139, coils 118 and 119 in series, and through line 140 to coil 120, from coil 120 through line 144 to contact 145 of the switch 143, thence it returns through switch arm 148 and line 137 to the current source 130. In this arrangement of the circuit only the coils 113 to 120 are connected in the circuit, and currents are induced in the vessel only by these coils; consequently the maximum heating is applied to the portions of the vessel adjacent to these coils.

Figure 18:
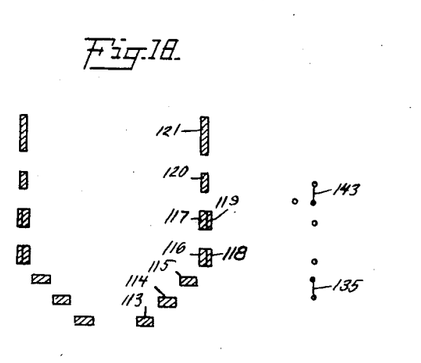

With the arm of switch 135 in the down position and the arm of switch 143 in the up position as illustrated in Fig. 18, current will pass from current source 130 through line 132 to coil 113 and through coils 113 to 117 in series as in the previous arrangements. It then passes from coil 117 through line 133, through arm 134 of switch 135, thence to contact 136, through line 139 to coil 118 and in series through coils 118 and 119, line 140, and coils 120 and 121; thence through line 146 to contact 147, through switch arm 148 and line 137 to the current source. In this arrangement of the coils all the coils 113 to 121 are connected in series and heat will be supplied over the entire surface of the vessel.

As in the first modification of the invention, the most intense heat may be applied, in the second modification, to that portion of the vessel which requires it. If the vessel is filled with liquid, for example, heat may be applied by means of all of the induction coils as indicated in Fig. 18. With the apparatus designed as illustrated, this arrangement results in the greatest application of heat at the bottom of the vessel, the intensity gradually diminishing up the vessel, but this may be altered by varying the construction or design of the coils or vessel. If on the other hand the liquid level is reduced or if for another reason it is desired to reduce the extent of application of heat, the coil 21 or coils 21 and 22 or the coils 18 to 21 may be cut out of the circuit by suitable operation of the switches.

From the foregoing description of the form of the invention illustrated in the drawings it will be apparent that the location and area of the vessel in which heat is developed and the amount of heat produced may be selectively varied by operation of the switching mechanism controlling the flow of current through the conductor which constitutes the primary for the heater and the various sections thereof.

While I have illustrated and described a preferred form of my invention by way of illustration, it will be apparent that the invention may be used for heating metallic articles other than vessels or stills. It will also be apparent that the invention is not limited to the use of the specific circuit arrangements illustrated and described but is capable of a wide range of variations without departing from the spirit and scope thereof.

I claim:

1. An electrical heating apparatus comprising a member to be heated, a conductor encircling said member, in inductive relation therewith, a source of alternating current, a plurality of elements connecting said conductor to said source of alternating current, selective means for varying the amount and location of heat generated in said member including a switch movable to vary the flow of current through said conductor.

2. An electrical heating apparatus comprising a member to be heated, a conductor encircling said member, in inductive relation therewith a source of alternating current, a plurality of elements connecting said conductor to said source of alternating current dividing said conductor into a plurality of sections, and means for varying the area of said member in which induced currents are generated including a switch in circuit with said conductor movable to control the flow of current through one of the sections of said conductor.

3. An electrical heating apparatus comprising a member to be heated, a conductor encircling said member in inductive relation therewith, a source of alternating current, a plurality of elements connecting said conductor to said source of alternating current dividing said conductor into a plurality of sections, and a circuit control device selectively movable to connect sections of said conductor to said source of current in series and in parallel and to disconnect one or more of said sections from said source of current.

4. An electrical heating device comprising a member to be heated, an electrical conductor in inductive relation with said member, a source of alternating current, elements connecting said conductor to said source of current, a second conductor in inductive relation with said member, elements connecting said second conductor to said source of current at a plurality of points dividing said second conductor into a plurality of sections, means for selectively connecting either or both of said conductors to said source of current, and a switch movable to vary the current flow in the sections of the second conductor independently of the current flow in said first mentioned conductor.

5. An electrically heated still comprising a metallic vessel, an electrical conductor encircling said vessel in inductive relation therewith, a source of alternating current, elements connecting said conductor to said source of current, and selective means for varying the amount and location of heat generated in said vessel, including a member movable to control the flow of current through said conductor.

6. An electrically heated still comprising a metallic vessel, an electrical conductor encircling the upper portion of said vessel in conductive relation therewith, an electrical conductor encircling the lower portion of said vessel in conductive relation therewith, a source of alternating current, electrically conductive elements connecting said conductors to said source of current, means for varying the amount and location of heat generated in said vessel including a member movable to vary the current flow in one of said conductors independently of the other.

7. An electrical heating apparatus comprising a member to be heated, a conductor encircling said member in a plurality of turns, means carried by said member supporting said conductor, insulating elements carried by said means spacing the turns of said conductor from each other, a source of alternating current, and means connecting said conductor to said source of current.

8. An electrical heating apparatus comprising a member to be heated, a conductor encircling said member in a plurality of turns, a plurality of rods extending transversely of said conductor adjacent thereto, means spacing the turns of said conductor from each other, means securing said conductor in position with reference to said rods, a source of alternating current, and means connecting said conductor to said source of alternating current.

9. An electrical heating apparatus comprising a member to be heated, a conductor encircling said member in a plurality of turns, a plurality of rods extending transversely of said conductor adjacent thereto, means spacing the turns of said conductor from each other, means securing said conductor in position with reference to said rods, a source of alternating current, means connecting said conductor to said source of current at a plurality of points dividing said conductor into a plurality of sections, and a switch movable to vary the current flow in one of said sections independently of the current flow in another of said sections.

10. An electrical heating apparatus comprising a member to be heated, a conductor encircling said member in a plurality of turns, a plurality of rods extending transversely of said conductor adjacent thereto, means carried by said rods spacing the turns of said conductor from each other and securing said conductor in position with reference to said rods, a source of alternating current, and means connecting said conductor to said source of alternating current.

11. An electrically heated still comprising a metallic vessel adapted to receive liquid to be distilled, a flange formed integral with said vessel and extending outwardly therefrom, vertically extending rods supported by said flange and positioned about said vessel, an electrical conductor encircling said vessel in inductive relation therewith, insulating means carried by said rods engaging said conductor to hold the same in position, a source of alternating current, elements connecting said conductor to said source of current and selective means for varying the amount and location of heat generated in said vessel including a switch connected to said conductor and movable to vary current flow through said conductor.

12. In the application of heat to a metallic member, the method of controlling the location of heating effect of maximum intensity, which comprises subjecting the metallic element to induced currents having a plurality of independently variable magnitudes and changing the location of the induced current of maximum magnitude to conform to a desired change in location of heating effect of maximum intensity.

13. A method of distilling liquids which comprising introducing the liquid to be distilled into a metallic vessel, inducing current flow in said vessel by the action of alternating current, removing vapors of said liquid from said vessel, and diminishing the area of the vessel heated as the level of the liquid in said vessel is lowered by the distillation of liquid therefrom.

14. A method of distilling liquids involving variation in the liquid level during the distillation, which comprises introducing liquid to be distilled into a metallic vessel, inducing electrical currents in said vessel whereby said vessel and liquid are heated, controlling the location and amount of current induced in said vessel during distillation of said liquid, and maintaining the portion of said vessel in contact with said liquid at a temperature substantially higher than the temperature of that portion of the vessel which is in contact with the vapors produced in distilling said liquid.

15. A method of distilling liquids which comprises introducing a liquid to be distilled into a metallic vessel, inducing current flow in the walls of said vessel by the action of alternating current, removing vapors of the liquid being distilled from said vessel, decreasing the current induced in the upper portion of the walls of said vessel as the level of the liquid in said vessel is lowered, and maintaining the current induced in the portion of the vessel in contact with said liquid substantially constant.

16. A method of heating a liquid in a metallic vessel in which the portion of the vessel occupied by liquid varies during the heating, which method comprises inducing current flow in said vessel by the action of alternating current and controlling the flow of current in such a manner that the zone of most intense heating is restricted to the portion of the vessel occupied by liquid.

17. A heating apparatus comprising a vessel adapted to contain material to be heated, an induction coil encircling a lower portion of said vessel, a second induction coil encircling an upper portion of said vessel, each of said coils being adapted to induce an electrical current in a substantial portion of said vessel, means for supplying alternating current to said induction coils, and means for independently controlling the current supplied to each of said coils.

18. An electrically heated apparatus comprising a metallic vessel, supporting legs circumferentially disposed thereabout, coil supporting members mounted on said legs, a series of induction coils disposed about said vessel adjacent to different portions thereof and supported by said supporting legs, means for connecting a plurality of the coils in series in an electric circuit, and means for removing one of said coils from the circuit while retaining another coil in the circuit.

GEORGE ANTHONY PATTERSON.